United States Patent
Gibson

(12) 
(10) Patent No.: US 11,669,640 B1
(45) Date of Patent: Jun. 6, 2023

(54) METHOD OF PROVIDING DATA INTEGRITY

(71) Applicant: Jeffrey S. Gibson, Fort Smith, AR (US)

(72) Inventor: Jeffrey S. Gibson, Fort Smith, AR (US)

(73) Assignee: SB&G Innovations, Inc., Fishers, IN (US)

( * ) Notice: Subject to any disclaimer, the term of this patent is extended or adjusted under 35 U.S.C. 154(b) by 0 days.

(21) Appl. No.: 15/990,582

(22) Filed: May 25, 2018

Related U.S. Application Data

(60) Provisional application No. 62/510,769, filed on May 25, 2017.

(51) Int. Cl.
   *G06F 21/64* (2013.01)
   *G06K 7/10* (2006.01)
   *G06K 19/04* (2006.01)

(52) U.S. Cl.
   CPC ......... *G06F 21/64* (2013.01); *G06K 7/10237* (2013.01); *G06K 19/045* (2013.01)

(58) Field of Classification Search
   CPC ... G06F 21/64; G06K 7/10237; G06K 19/045
   See application file for complete search history.

(56) References Cited

U.S. PATENT DOCUMENTS

| | | | | |
|---|---|---|---|---|
| 9,980,140 | B1* | 5/2018 | Spencer | H04W 12/02 |
| 2009/0209849 | A1* | 8/2009 | Rowe | A61B 5/14539 340/8.1 |
| 2013/0134774 | A1* | 5/2013 | Kennedy | G06F 1/26 439/620.23 |
| 2014/0333744 | A1* | 11/2014 | Baym | G08B 21/245 348/77 |

* cited by examiner

Primary Examiner — Tuyen K Vo
(74) Attorney, Agent, or Firm — William S. Parks

(57) ABSTRACT

Provided herein is a system involving the utilization of a low-power device that is programmed to capture data from a source, whether from a sensor or other type of data generating component, with the data capture and/or further data transfer set within a specific time period and further data storage platform having programmed storage compartments uniformly set to meet the exact date and time for which the data capture and/or transfer was initially undertaken. Having a known value of storage capacity for each timed data packet in this manner, the ability to ensure veracity of the transferred data is provided since any result that does not meet the time frame and thus the storage capacity set from the programmed platform itself will result in a quarantine of any problematic data packet, thus allowing for filtering and review of any unexpected data captured and transferred in such a manner.

2 Claims, 1 Drawing Sheet

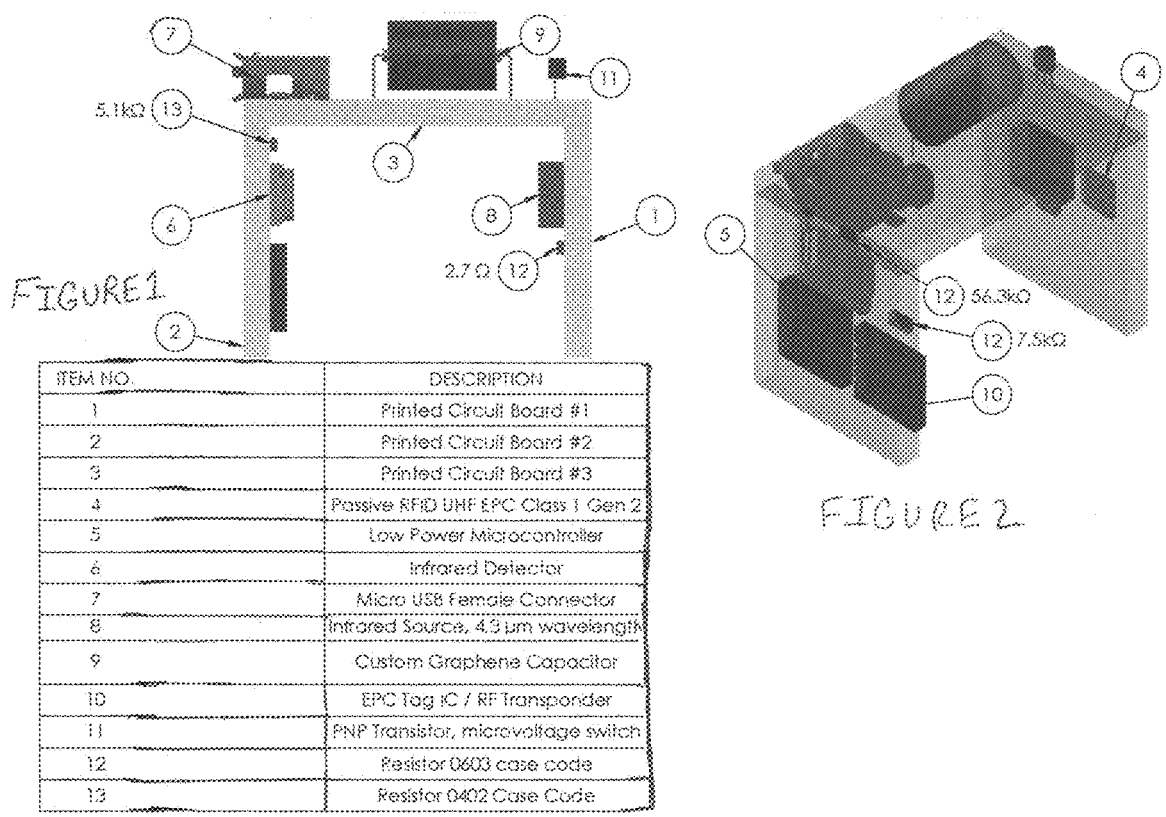

METHOD OF PROVIDING DATA INTEGRITY

CROSS-REFERENCE TO RELATED APPLICATION

This application claims the benefit of U.S. Provisional Patent Application No. 62/510,769, filed on May 25, 2017, the entirety thereof being herein incorporated by reference.

FIELD OF THE INVENTION

This invention pertains to a method and system of reliably capturing, transferring, and utilizing data for myriad end uses. Such a system involves the utilization of a low-power device that is programmed to capture data from a source, whether from a sensor or other type of data generating component, with the data capture and/or further data transfer set within a specific time period and further data storage platform having programmed storage compartments uniformly set to meet the exact date and time for which the data capture and/or transfer was initially undertaken. Having a known value of storage capacity for each timed data packet in this manner, the ability to ensure veracity of the transferred data is provided since any result that does not meet the time frame and thus the storage capacity set from the programmed platform itself will result in a quarantine of any problematic data packet, thus allowing for filtering and review of any unexpected data captured and transferred in such a manner. In this way, the overarching benefit of this system is that the ultimately stored data captured initially and transferred to, for instance, a cloud database, is ensured as reliable and uncompromised, thereby providing a method of data integrity that has heretofore been nonexistent within the computer world, not to mention within the myriad of industries for which such data integrity is of enormous importance and high necessity.

BACKGROUND OF THE PRIOR ART

The importance of reliable data capture and transfer cannot be overstated in today's world. The vast majority of commerce, health care, financial transactions, communications, electrical infrastructure, and so on, depend upon computerized networks and data transfer is the basis of such industries functioning properly. Corrupted data, such as through hacking, viruses, worms, etc., creates billions, at least, of dollars in damage and stolen information (as well as personal funds) throughout the world each year. The ability to prevent data hacks is a constant need that seems to fail regularly as bad actors develop new and seemingly unknown and untraceable means to steal, corrupt, etc., data through such networks, necessitating fixes that not only come too late, but also appear to treat symptoms rather than causes of such data hack capabilities. As such, there is a constant desire of the computerized world to provide a safe and reliable, if not simplified and efficient, manner of delaying, if not completely preventing, data hacking to allow for resources and time to be devoted to actual utilization of reliable data, rather than devoting excessive funds and attention to data hacking aftermaths or trying to predict how the next hack will commence.

Thus, there is and continues to remain a significant need to provide data integrity across a broad spectrum of industries in a straightforward and reliable manner. Attempts have been made to achieve some semblance of reliable data transfer, of course, for many years. Unfortunately, however, such "fixes" appear to provide mere obstacles to corruption as bad actors (hackers) continue to develop new ways to introduce viruses, Trojan Horses, worms, etc., into data bases and programs regularly. Encryption provides some obstacles, of course, but hackers have developed ways to decrypt such impediments, meaning that encryption technology, on its own, seems to be a time-based protective means that is hopefully sufficient for such a time period to deflect hack opportunities until a new and better system may be implemented. Other means, including floating and/or revolving data access routes may provide some protection in this manner, certainly, but, again, such operations appear to provide protections over a certain time period, rather than in perpetuity, much like the encryption issues noted above. In any event, the ability to ensure data integrity has certainly never been foolproof within the computer industry, but the search has continued to improve upon such necessary attributes in order to best accord the commercial, financial, etc., world with the efficiencies and data transfer and storage benefits that allow for smooth operations across the board. To date, such has not been available. The present invention appears to overcome such prior deficiencies and meets the needs of non-hackable computerized language, code, databases, and systems.

Of further interest is the considerations of data capture and transfer in general and the importance of allowing for continuous monitoring of conditions through the utilization of a desirably reliable computerized system. As alluded to above, there exists a definitive need for a better practice in the way of data generation, particularly as it concerns sensor devices and the like. Sensors have been utilized for many years, and in various ways, to monitor and provide data for analysis and assessment of myriad situations, statuses, conditions, etc. The basic principle followed, however, has been the reliance of such a device to provide data that is necessary for a specific purpose (or purposes). There are significant drawbacks with sensor devices in the way of, as examples, power necessity for actual operations, reliance of measured values due to limitations on actual depths of specificity of measurement, and, at least, potential introduction of corrupted measurements and/or information from outside sources. In other words, the ability to hone in on specific measurable criteria through the utilization of a sensor device has been limited to factors associated with the actual instruments provided; whether it be in relation to size issues (too large for continuous monitoring, for example), limitations of actual levels and degrees of investigative capability (the sensor analytics are directed to achievable targets that are not as pertinent as they could be, for example), and/or the costs associated with actual implementation are simply too great for efficient operations to occur, there are definite problems inherent with sensor technologies. Coupled with the lack of permitting controlled and protected information gathering/capture and subsequent transfer to proper storage units for further processing, there remain troubling aspects of such monitoring devices that drastically limit their overall usefulness, at least in certain areas. For instance, healthcare modules include myriad sensors to at least attempt to monitor patient statuses over certain timeframes. There are, however, as alluded to previously, drawbacks to a number of sensor technologies currently on the market and in use, even widespread, within the healthcare industry. Comfort for the patient is an initial concern as many sensors now provided are cumbersome and reduce mobility for the subject patient considerably. Additionally, even with such size issues, there are significant concerns with many sensor measurement results. Pulsoximetry, for instance, is limited to monitoring externally a patient's propensity to exhibit levels of hemoglobin capture, albeit primarily in terms of any type of molecule, not necessarily oxygen. Thus, the actual measurements accorded such an instrument may not provide any sort of reliable data at all, but is utilized as a possible means to determine patient status. Likewise, then, as recently realized in rather widespread fashion, there are bad actors that can access any type of computerized system, currently, at least, and abscond with, or at least have direct access to, recorded measurements (or other records) associated with patients. Such viral invasions within highly susceptible instrumentation (any device that transfers and/or receives computerized data is at risk, in other words) leaves not only the monitor devices in suspect situations, but the patient's overall records for proper and continued treatments, diagnoses, etc., are potentially lying in wait for corruption as well. Furthermore, without any further capability of ensuring archived data for a patient remains with proper integrity after a possible intrusion of this type, there further exists a troubling level of uncertainty as to providing reliable treatments to any patients, particularly those whose own health status data has been compromised. As it stands, then, and as above, there remains a definite need within various industries (not only health care) of a method and/or system to ensure data is captured, transferred, and stored, if not provided in archived format for simple reconstruction on demand, as well, in completely safe, definitively uncorrupted, fashion. To date, there is no system that has been able to achieve such a result; until now.

Advantages and Description of the Invention

The clear advantage accorded this inventive method and/or system is the ability to capture, transfer, and store information without any potential for improper intrusion as the system itself will easily determine if an intrusion has occurred and filter such unwanted and, at that moment in time, unprocessed, data, for sequestration and analysis, thereby preventing any improper hacking, stealing, or other undesirable action in relation to the data itself. Another advantage is the ability to do so with a simple, easy-to-use and easy-to-program device and system to facilitate implementation on a widespread basis. Yet another advantage is the ability to not only provide continuous monitoring of any type of situation, but also the ability, while monitoring is undertaken, to implement a check and balance activity to ensure proper operation of the device and/or system itself, to further ensure the integrity of any captured, transferred, and/or stored data involved therewith. Additionally, then, another advantage of the inventive system and/or method is the ability thereof to provide an overall archived (or archivable, at least) history of captured, transferred, and stored data for reconstruction on demand thereof.

Such a system and/or method thus provides not only a means to properly and continuously monitor any type of situation for measurement, analysis, and notification, if desired, in relation thereto, but also to monitor in relation to potentially "skimmed" information, data, or identifications in relation to a system component with the capability of indicating such a result and apparent action from an unauthorized outside source and to determine whether such a bad actor is attempting to utilize such information, data, and/or identification(s) thereafter. In any event, the overall capabilities of the inventive system and/or method are myriad themselves in relation to any type of situation that involves data capture, transfer, and/or storage for the ultimate result in retaining integrity of such data throughout its useful life.

Accordingly, such a system and/or method utilizes an externally powered tag device that further includes data write-on capability from a computerized device and transfers any received data on demand to an external reader, as well. In this manner, as one potentially preferred type of component device, there would be considered radio-frequency identification tags (and any other similar types of tags, as well). Such tags, wherein the system and/or method would utilize at least one, potentially preferably at least two, with a plurality to any number that may be provided to provide the desired effects described herein, exhibit the above-mentioned important properties of receiving external signals (data calls, for instance, from an eternal RFID reader), write-on capability from a separate microprocessor (computerized device), and transfer to such an RFID reader on demand, as well. Of course, RFID tags have been utilized for many years and for different end uses, primarily, if not limited to, however, means to receiving information and transferring the same. This may be a part of the inventive system and/or method, but that aspect, as well known in the computer industry (if not the RFID industry) does not provide any sense of data integrity at all. The ability for an outside source to access such RFID transferred data is common and the ability, then, to further learn the identification (CPC code, for instance) of a specific RFID tag to further write upon the same as desired, leaves such tags, as currently and as historically used, highly susceptible to hacking and other bad actions. In such prior operations, particularly with the utilization of a single data call in relation to RFID tags, the data transferred is processed at that site, leaving the entirety of the system exposed to viruses and the like. To the contrary, then, the current system and/or method utilizes a further beneficial property of the combined RFID tag/external reader "relationship", namely the ability to provide not only a single data call per data transfer cycle, but at least two separate signals to one or more RFID tags that creates a definitive time period duration that includes a definitive amount of data transfer measurements (whether in terms of actual time to transfer or data packet storage measure, kilobytes, for instance, or both) that are then recorded within the external reader. Additionally, and again, to the contrary in comparison with prior RFID tag and reader systems, the data transferred to the RFID tag and then to the external reader is raw in nature and not processed until transferred ultimately to the storage database (where it is analyzed for any viruses, etc., as discussed below). In this manner, then, by keeping raw data separate without being processed prior to writing to the tag (such as from the MCU), the system provides further benefit of a level of multiparty encryption until transferred, again, ultimately, to the storage database. From there, however, and upon receipt of such data packets from the RFID tag to the external reader, the ultimate storage database (such as, for instance, a cloud database) then formats storage capacity in relation to the specific time duration (with each data packet associated with a specific date and time stamp within the database) leaving open such entries until receipt from the external reader is accomplished. The database thus "fills" each entry in relation to the specific date and time stamp correlated to the exact duration undertaken by the RFID tag(s) through the signals received from the external reader. In this manner, then, and again, with the receipt of specific amounts of data within each data packet generated and transferred in this manner, and further, if not primarily, or solely, in relation to the exact date and time stamp associated with the signal(s) provided by the external reader, the overall effect is that no outside data may be entered within the data packet from the RFID tag as written thereon without creating a sequestration result, effectively preventing any processing of data that does not meet the criteria required of the database in relation, again, to the external reader signals and the expected data captured and transferred by the RFID tag.

In more succinct detail, then, the inventive system and/or method may be considered pursuant to the following:

A data capturing device (whether a sensor or other type of device) is provided with at least one RFID tag, preferably at least two RFID tags, wherein both are attuned to an external RFID reader device, the data capturing device further including a microprocessing computerized unit (MCU) that is correlated to at least one of the RFID tags therein, and, if needed, a further sensor or like structure correlated to the MCU and at least one RFID tag through the further presence and utilization of a voltage regulator component. In this structural configuration, any data captured would be through the function of the sensor or like component. The initiation of actual data capture is undertaken through the transmission of a data call signal to one RFID tag (request for identification thereof in relation to its specific CPC code); upon receipt of such a transmission, the RFID tag "powers up" through actual generation and transmission back of the CPC code for such identification purposes. This "powering up" does not involve much in terms of actual voltage, but such does essentially generate enough that the associated voltage sensing switch senses such a result and, in turn, reacts through increasing voltage within the device itself, serving as a "switch" for the sensor or other component, for example. At this moment, then, the sensor or other device itself powers up and operates as designed to monitor a specific situation and to generate a result that is automatically transferred to the MCU for storage, temporarily, within a flash memory therein. Simultaneously, then upon receipt of such data from the sensor, the MCU, having an internal clock programmed appropriately, indicates the necessity for the MCU to deactivate the voltage sensing switch to then shut down the sensor or other like component, thereby ending, again, at least temporarily, the generation and transfer of such measured and/or captured data. The MCU then further formats the received data to a suitable language (for instance, hexadecimal language) and automatically transmits the formatted resultant data to the RFID tag (second one, preferably, though not necessarily, as one single tag may be utilized for both RFID tag activities in this method) for write-on within its own EPC layer. The RFID tag then awaits for the data call from the external reader, thereby initiating the transmission of such written on data to the reader at which point the reader then automatically transfers such received data to the storage database (cloud, again, as one example), for long-term storage and compiling as needed for archival and retrieval purposes. Such a cycle is then repeated as needed and at specific desired times in order to compile and store as much data as needed for whatever desired purpose. The system and/or method of this invention thus relies upon each cycled data call signal from the external reader, with the first as the identification request ("power up" step) to the first RFID tag (or, again, same RFID tag as receiving information), with that specific time referred to here as T(1), and then the second signal from the external reader to the second (or same) RFID tag, again requesting identification, but also, as a result, receiving any data written upon the EPC layer present at the moment of such signal transmission, with such a second signal referred to herein as T(2). Thus, the set duration between T(1) and T(2) serves as the basis for determining the specific timeframe and date and time stamp associated with the data packet received from the RFID tag by the external reader. Additionally, there may be created a third time interval [T(3)] associated with the exact moment the MCU writes to the receiving RFID tag with the date and time stamp; such a third time falls between T(1) and T(2), clearly, and provides another level of information to be used, possibly, for storage precision within the storage database. Thus, the storage database then opens a "to be filled" compartment, if you will, in association with these time frame (data and time stamp) particulars which remains unfilled until the database, at least, definitively assesses the data packet contents in relation to timeframe and, possibly, actual kilobytes transferred, before "filling" such an open compartment therewith. If the timeframe particulars are skewed to any degree, the database will not allow such compartment "filling" at that moment, but will sequester the specific data packet for immediate filtering and analysis to determine the reasons for such a skewed timeframe result. In this manner, as noted above, the data is not processed to any degree, but is captured, transferred, and seeking storage within the database before any such processing occurs. If the skewed timeframe result for the particular data packet is determined to be corrupted data, whether via hack, skimmed information, and the like, the database filter will, again, remove such from the data packet and determine the course of action for the extraneous data located therein. The database may then take the filtered and reassessed data packet and store it within the open compartment for "filling" in association with the time frame at issue, or it may store such within a separate compartment as an indicator of the exact time and date that corrupted data was received within the data capture and transfer device. The overall system and/or method may then, if for instance, a significant corruption is detected or continued receipt of corrupted data are found, reboot to restart to continue the monitoring operations with the added benefit, again, that the database may archive the entirety of the transactions that occurred for reconstruction thereof on demand. Such reconstruction does not solely provide a means to review any corrupted data situations, certainly, as the ability to reconstruct the entirety of all transactions involving the data capturing and transferring device itself would be important for such purposes, too.

It is important to note that such data capture and transfer operations may be undertaken in cycles that may range from once an hour (or longer) all the way down to once every 100 microseconds (or shorter), as examples. Such precise short time intervals are limited only by the external reader speed, the RFID tag speeds, and/or the MCU processor speed, as well as possibly the RFID tag cycling limitations. With such a long duration between signals form the external reader, any data that is captured outside the timeframe programmed in relation to the external reader data call signals, would be easily detected as improper and corrupted. Such long-term cycles may be in relation to monitoring large materials or structures, such as, for instance, household appliances, and other like items that do not require constant monitoring with very short duration cycles. As it concerns, however, the shorter duration cycles, such as for identification cards, health care monitoring, and other like situations where exactness and high resolution monitoring results are desired, the microsecond cycle operations may be utilized. In such a manner, with a cycle of, for instance, T(1) at zero and T(2) at 100 microseconds, with a "rest" of 100 microseconds, then starting over, the overall system would determine the data packet size in relation to such a microburst and sensor (or like device) data capture, transfer instantaneously to the MCU, and write-on to the RFID tag, etc., within such a short duration. The storage database would receive and indicate compartmentalization for "filling" in relation to such a T(1) and T(2) timeframe, as well, and, again, any skewed timeframe (or possibly expected data size received) would be properly handled quickly for determination of source of such a skewed result. The higher resolution capability, however, provides not only this storage database capability, but, as important, perhaps, the ability to provide greater reliability in terms of the actual data received as it concerns the continuous monitoring aspects. The data integrity itself is provided, additionally, through the timeframe (data and time stamp) data packet specifics and the database capability of separating out any skewed results. Thus, on top of not only such data integrity characteristics, the overall system and/or method accords the user a high resolution capability that is unmatched in terms of monitoring results, as well. The utilization of the two RFID tag (or twice signaled individual RFID tag) methodology thus accords these multiple benefits unheard of within the data capture and transfer arena, let alone in terms of protectable data processing industry. Such high resolution capabilities provide power savings and levels that may be adjusted on demand by either administrative manual controls, reader software adjustments, rules engine artificial intelligence controls, or other digital automation technologies.

Another significant benefit and, for that matter, advantage, is the ability of this system to provide its own continuous checking and balancing to ensure the actual operations are properly running as needed and desired. Such malfunction system checks are, as follows:

1) if the RFID initiator tag excites and discharges, it cannot reopen switch (such as the voltage sensing switch) that is open at that moment (thus preventing excessive activity within the sensor);

2) When the RFID initiator tag discharges, if synchronized with the other RFID tag, the other RFID (data) tag will send data to the external reader and the reader will identify both in relation to embedded CPC codes (otherwise the second RFID data tag will receive its own data call subsequent to that of the first RFID initiator tag);

3) the MCU cache will include any discharge data from first RFID initiator tag if properly activated; if two exact duplicate data sets are received from the reader at the data center (storage database), the system then reviews the very next data set which, if it includes data showing first initiator RFID tag discharge, then those data sets will be understood to be duplicated and a subsequent systems check will determine:

a) whether it is an MCU or system switch malfunction, which is indicated by RFID reader detection of continued data writing with RFID discharge with each transferred data set and the RFID reader software will show both RFID tags discharging data at properly defined time intervals;

b) whether it is an initiator RFID tag malfunction, which is indicated by correction within the next cycle or, without correction, the RFID reader software will show the rate at which each RFID tag discharges data and the first initiator RFID tag will show discharge at improper time intervals;

c) whether it is a sensor source or sensor malfunction, which is indicated by failure for MCU to power on and the system will be powered down as well, however, the RFID tag reader software will continue to show data discharge from the RFID tags, and the MCU data tag will show repeated data;

d) whether it is the second RFID tag malfunction, indicated by the discharge by the first RFID tag in the RFID reader software and second RFID fails to transfer data to RFID reader; and/or e) whether it is the reader, indicated by full failure of entire system; and 4) the MCU cache receives switch activation data from the MCU to indicate status of data transferred to second RFID tag from MCU (if out of synch, the transferred data to the second RFID data tag will be wrong or old data; switch activation data thus indicates if the first and second RFID tags are working properly). All of these data integrity validation guidelines will be incorporated at the data center (storage database) to validate each data cycle set and to provide complete system self-checks and verifications in order to provide another line of reliability and integrity to the data generated, transferred, received, and stored. To that end, the system may use any number of available cycle sets (including a standard of 3 hertz cycle sets, as one example) programmed into the RFID reader software, thus providing three complete system checks per second, or any checks per second as desired.

In more succinct detail, perhaps, the capability of capturing and transferred data may be undertaken through the utilization of a sensor through a low-power device with the ability to further transfer such data in a proper format to an external receiver for further processing. Such a system and method include the utilization of at least two radio frequency identifier (RFID) tags that provide separate operations within the overall device, a microcomputer unit (MCU) with a flash memory and programmed formatting software to convert data, a sensor component to measure and generate data for transfer to the MCU, with the MCU transferring such formatted data (in hexadecimal or like language) to the other RFID tag. The second RFID tag is configured to receive such formatted data from the MCU and transfer the same to the external receiver. The important capability of the system is three-fold, at least, in that the second RFID tag repeatedly accepts the formatted data from the MCU (within the RFID tag's EPC layer) through a typical write-over step, with the subsequent operation for immediate transfer of any received data to the external receiver. In this manner, the system best ensures that all recorded data is properly transferred for further processing external to the collection device. Likewise, then, it is of great importance that, the overall device generate effective and reliable data for such further processing, namely the ability to generate data points in relation to time that can be assessed and compared by a suitable algorithm and/or rules engine to eventually develop a reliable standardized and updated base to permit continued assessment of the tested subject (whether a person, machine, animal, other sensor, and the like) to provide a suitable prediction model for future activities and conditions. To that end, then, the first RFID tag is utilized not as a typical write-on component, but as a means to generate power for a switch to activate the sensor component to measure, etc., the subject for whatever consideration needed, and then transfer data results to the MCU. Such a first RFID tag receives a signal from the external receiver and transfers its CPC code thereto, an operation that causes the first RFID tag to generate a small amount of voltage, sufficient to activate a voltage regulator switch that activates the sensor. The data transfer to the MCU from the sensor causes such an MCU to receive such data (and store such within a flash memory therein) and cause power down of the sensor, while the internal clock thereof the MCU indicates such a power down and then formatting (into hexadecimal of like language) of the stored data for transfer (write over) to the second RFID tag. The external receiver (RFID reader, for instance) then sends a data call to the second RFID tag to request data transfer which, upon receipt of the signal, is then transferred allowing the MCU to transfer more formatted data to write over the now-external-reader-transferred data on the second RFID tag. The entire cycle then begins again when the external reader sends the separate signal for the CPC code to the first RFID tag, allowing for continuous sensor activation for a low power device with reliability that the captured and transferred data is immediate and constantly updated over short time intervals. This two RFID tag system (a single tag or a plurality, any number, in other words, may also be utilized) thus further permits the ability to generate higher resolution data readings through decreasing the time intervals for actual operations within each cycle, as well as the ability for the external reader (and/or the MCU), at least, to perform diagnostic assessments in real time and extremely quickly in order to best ensure the overall device is functioning properly in each aspect. With a fine-tuned device in operation, and such readings being taken at points in time that are milliseconds apart from one another, the low-power property is easily permitted and the measured results are captured, formatted, and transferred to the external reader for further transfer to a suitable database/system for immediate data assessment and analysis within a rules engine/algorithm to generate the above-noted standardized results (waveform, etc., as a possibility). Importantly, the data captured and transferred from the device to the external reader is in raw form and not processed to any degree; this fact, coupled with the ability to specifically compartmentalize and store such raw data within the database (which receives such raw data from the external reader) in "fillable" slots attuned to the specific timeframe properties generated in relation to the T(1) and T(2), and possibly T(3) times set for each raw data packet, allows for the system to generate and transfer data with full integrity. If the raw data is compromised in any way from the sensor to the RFID data tag (through the MCU) to the external reader, the storage database will not be able to fill an open slot therein, thus requiring the system to sequester, filter, and analyze all raw data within the storage database prior to actual processing (which could only occur once the proper raw data slot is filled). Thus, as noted above, if the time properties are compromised in any way, it is an indication that more data than should be present has been transferred to the RFID data tag (and then the external reader and further to the storage database). This highly reliable collected and analyzed data thus can be utilized in real time to provide a prediction model in relation to the specific measured sensor platform for whatever need desired, whether it concern specific health issues for an individual or a population of persons, to continuously used machinery (or specific parts thereof), and the like. Thus, such a platform may be incorporated within any health-related monitoring system, whether in vivo (such as, without limitation, for blood monitoring to determine certain enzyme, protein, blood cell, etc., levels therein), external to a person (such as, again, without limitation, capnography monitoring for carbon dioxide level measurements in relation to breathing status), instrumentation monitoring internally (such as, without limitation, for monitoring the functioning level of pacemakers, or even for the basis of pacemaker sensor data capture and generation), external instrumentation (such as, without limitation, blood pressure monitoring, temperature monitoring, and the like), or otherwise. Health conditions may be monitored in this manner to provide not only highly reliable data for immediate and continuous updated of status, but further to provide immediate notifications of any problems the subject patient may suffer at any time during such monitoring. Additionally, however, and as described in greater detail below, such a system allows, due to the integrity of the data captured, transferred, and stored within the database itself over any desired period of time on a continuous basis, such a system provides the basis for further data processing and handling to develop the first true and reliable artificial intelligence platform for the development of personal patient standards in relation to such captured and transferred data. In other words, with the continuous and consistent and, for that matter, reliability of such data (of such high integrity), the database may be programmed to assess the data during/after processing to create a continuously updated waveform or like comparative reading in relation to the monitored measurements of the subject patient. Over time, and with such capability of high resolution recordations in reliable form, the database may process the data and create a continuously updated (and averaged) result for the measured physical, etc., property monitored by the underlying device. This consistently and continuously updated information thus creates, in relation to a rules engine/algorithm within the database, the means to predict future conditions and statuses of the subject patient in relation to the measurements continually undertaken, captured, and transferred through the raw data that is processed at the database. In this manner, a predictive treatment platform may be developed through the artificial intelligence of the storage database through the rules engine/algorithm utilization and the handling and processing of the measurement data from the device itself. Importantly, it has been well understood that such predictive treatment planes have suffered from the lack of data integrity and reliability in the past. Although there have been outlines provided for such "artificial" prediction platforms to take root, in actuality such have proven to be highly unreliable due to this clear and definitive lack of clarity in terms of measured and received data. Whether it be due to the irregularities that are evident in relation to standard sensor technology in use today, or the lack of trust in received information from electronically generated and/or transferred information, there has existed a limit to the capabilities of such hoped-for predictive platforms. With the potential for his risk and liabilities with incorrect assessments and final predictive results, the lack of data integrity has halted implementation of definitive systems for this purpose, particularly within the health care industry. With this invention, however, the level of integrity is higher than ever and the future of health care is looking extremely bright. With the extra benefit of a low-power device undertaking such data capture and transfer, as well, and the ability of an external reader to be placed within any distance thereof to receive such raw data and then transfer in encrypted format, if needed, such raw data to a specific database thereafter for analysis and ultimate processing is of great value, as well. Furthermore, then, the ability to ensure the reliability of such data prior to processing and the ability to compartmentalize safely and securely all captured and received data within the database in "filled" slots, and the further ability to ensure such slots are appropriately provided in relation to the timeframe of each data packet generation and transfer, the overall system provides a highly reliable block-chain capability as well. In other words, each and every generated data packet is, through this data integrity system, confirmed as reliable upon storage with data and time stamping in place and correlated to each data packet, as well, allowing for reconstruction of any and all such captured and received data packet on demand. Such permits complete insurance that there can be no corruption of the data and the ability to piece all such introduced data back together as needed for proof of any transaction involving such data, too. Thus, the versatility of this inventive system is extremely high in addition to the data integrity issues.

Thus, in one possible area of actual utilization of this data integrity method and system, health care monitoring and information data usage thereafter is one widespread industry with myriad possibilities. Such uses thus include, without any limitation, and as alluded to above, internal monitoring, whether in terms of organs, glands, bones, vascular systems, brain activity, body fluids (such as, without limitation, levels and/or content of cerebrospinal fluid), nervous, neurons, muscles, musculoskeletal systems, integumentary concerns, respiratory, aural, otolaryngitical, nasal, ocular, oral, dental, arthrological, excretory, reproductive, endocrinal, exocrinal, lymphatic, and any other body system, part, etc., that at any time would undergo periodical, at least, monitoring for any reason and/or measure. Such a basic data integrity method may thus be utilized for more than just human monitoring and captured, received, and transferred data processing at the database level, but any type of animal, plant, insect, etc., as well, as needed.

Of course, it goes without saying, that if such a monitoring system is useful for any type of periodical basis for a set location, place, part, etc., that such may be implemented in terms of manufactured items for which monitoring of status is undertaken or desired of undertaking within a continuous and consistent time period. As examples, automated vehicles, whether cars, trucks, buses, vans, motorcycles, airplanes, helicopters, trains, marine vessels, etc., whether manned or controlled remotely, are monitored for the purpose of notifying users, etc., if such a vehicle requires a repair or is set for a routine inspection, at least. The inventive system may be employed in terms of providing sensor technology for such a monitoring basis with the same reliability standards in place. Again, continuous measurements may be undertaken with and through the low-power, potentially high resolution, device (sensor, or any other data capturing, etc., type) and set at any cycle with each cycle set in terms of the T(1), T(2), and possibly T(3) times noted above. As each cycle generates data, the same is formatted by the MCU and written to the RFID data tag (after RFID initiator tag "power up" through the voltage regulator and regulator switch to turn on the sensor source and sensor, and so on, as described above), then transferred in raw form to the external reader for encrypted, if needed, transfer to the storage database for assessment as to "filling" the slot therein instituted in relation to the time properties noted above. Thus, the system basically functions in the same manner for any monitoring system. For vehicles, this may be utilized to monitoring anything from tire pressures, wear on metal or plastic components, battery power levels, alternator levels, gauge statuses, oil and gas levels, electronic component conditions (such as headlights, windshield wipers, internal fuses, and the like, without limitation), window power levels, remote key fob conditions, at least for automobiles, trucks, buses, and the like; for airplanes, the monitoring system may be for anything, as well, particularly anything concerning the wear and tear and constant assessment of conditions of turbine motors, structural components, pitot tubes (whether they are working properly, for instance), altimeters, speed controls and gauges, communication systems, temperature gauges, oxygen level indicators, etc., the list is myriad, of course; marine vessels would also include anything of the like for monitoring of structural, etc., conditions, as well.

Additionally, then, is the ability of this inventive system to provide constant and reliable data (without the chance for hacking in by a bad actor) for any device that would be present within a network, as well. For instance, and, again, without limitation, the potential to provide a monitoring device that allows for data integrity capture and transfer (and processing) to assess conditions (like for the vehicles above, at least), but within a network of devices (such as, without limitation, for within a person's home), thereby allowing such devices to communicate with one another artificially, would be highly desirable. Today, the "Internet of Things" is highly prized, but, as for artificial intelligence noted above, it simply includes too many risks to be implemented in reliable fashion. For instance, the ability to provide a bevy of appliances, not to mention, if desired, a fully functional all-encompassing home monitoring system, whether including thermostats, water heaters, security systems, electrical wire monitoring, remote control capabilities, etc., is the hoped-for future. Without data integrity, however, there is an incredibly high risk of problems associated with hackers entering the, for instance, weakest device, and accessing everything within such a network through that "door." Thus, for example, if a user has a full home of networking appliances, security systems, electrical systems, etc., and there is a manner of a bad actor hacking through the user's toaster that is linked to the entirety of the overall home network, then all of a sudden the entire system is compromised. Furthermore, if that local, personal network is linked to any others, or even to a larger network of a plethora of home systems, then the potential for a single bad actor accessing an entire network in such a way is possible. The means to prevent such an intrusion has not been forthcoming, unfortunately. However, the present invention would prevent such an incursion through the same basic method as described herein. The continuous monitoring device permits constant updates as to appliance, system, etc., status through the capture and generation of raw data that is transferred safely to a storage database and "filled" in slots in relation to specific time-based properties. Any modification from the time requirements creates a sequestration of raw data that is filtered, analyzed, and handled appropriately at the database level. Thus, the database "fills" slots appropriately (and may do so once any improper data is located and dealt with in relation to sequestered raw data packets) and keeps such data suitably for reconstruction purposes, as noted above. As well, and again, such a system provides data integrity at a level heretofore unattainable and thus may be utilized to construct an artificial intelligence platform for the predictive status potential for such monitored devices, systems (even vehicles, from above, too), etc., as is desired and possible, of course. This inventive system may thus be utilized for anything within a network, including power supply concerns, whether in terms of monitoring usage, availability, predictive capacity, etc., mass manufacturing issues, whether in terms of assessing uniformity concerns, etc., basically anything that includes a continuous monitoring platform. The ability to do so, as noted previously, through a low-power methodology (RFID tags require very little in terms of voltage to activate and the sensors themselves generally do not require much power to operate; if there is a need, however, a battery may be employed as desired, such as with lithium ion, graphene, or like low footprint varieties, to provide such power that is switched on or off through the voltage regulator switch as described herein. In essence, cumulatively, at least, the method herein described for providing data integrity of captured and transferred information may be implemented nearly anywhere or for any purpose, all with the low-power capability, block-chain capability, artificial intelligence capability, and versatility for utilization on demand with high-resolution results, provides a heretofore unknown and uninvestigated solution to myriad problems within the computer industry itself.

In any event, the overall inventive system and/or method may be employed within any operation that includes a continuous monitoring scenario, whether in terms of sensor technology for constant updates of conditions associated with measured and fluctuating results, or in terms of constant updating in relation to potentially accessed RFID tag information for identification purposes. With the first basic category, the possibilities are myriad as to actual end uses or even component uses, including, without limitation, health care monitoring, materials monitoring, article monitoring, device monitoring, network monitoring, and the like. The second category may be broadly considered, again, with myriad end uses or component uses, in terms of identification card reviews, financial card and/or transaction reviews, location access permissions, etc.

The term "computer program" or other like description is intended to denote that the overall method is controlled by software code and through the utilization of a computer machine (or the like) for implementation and utilization. The present invention may be implemented on a program or code that can be stored in a computer-readable (or electronically-readable) medium and that can be provided in a WAN environment. The overall system may be implemented onto a server using, as non-limiting examples, Apache web server, MySql on Linux, Oracle on Linux, Java servlets, Applets, HTML, JavaScript, Java, C#, and Microsoft's .NET, in such a manner as an account holder or account provider would have access thereto on demand through a secure connection. Such a server may reflect implementation on the Internet, an intranet, or an extranet. Any software platform may thus be employed to implement the overall system, or any part thereof, including the rules engine/ algorithm utilized within the database, such as JAVA, Linux, and the like, and the code itself may be written in any language, including, BASIC, COBOL, C+, C++, and the like.

BRIEF DESCRIPTION OF THE DRAWING

FIG. 1 is a side perspective view of a potentially preferred medical device utilizing the inventive method.

FIG. 2 is a different perspective view of the device of FIG. 1.

DETAILED DESCRIPTION OF THE DRAWINGS AND POTENTIALLY PREFERRED EMBODIMENTS

In greater detail, the system works, in an overarching fashion, in the following manner:

For data integrity purposes, having the proper RFID CPC code sent to the external reader in proper order with a time/date stamp, the first RFID initiator tag (associated with the voltage regulator switch) will have a date (data) and time stamp that occurs just before the date (data) and time stamp pertaining to the instant the MCU began to receive data. The MCU will use CRC methodology and embed the data into the data being written into the RFID data tag with the date (data) time stamp identifying when the data is being written to the RFID data tag. In one possible embodiment, the RFID data tag holds the data in relation to time (T1 when MCU received data, sensor data, T2 when the MCU sent data to the RFID data tag). The reader holds TS (which is the time when the RFID system initiating tag sent the CPC code to the external reader after receiving a data call), data from the RFID data tag which includes T1 and T2 time stamps, and the TF (the time when the RFID data tag sent data to the external reader). Because of the known values in relation to the programmed MCU data collection times, total operational time for data format transition, and complete MCU function, and ultimately the time for total system process completion. Any attempt to insert data or to corrupt data transferred would be nearly impossible since the data and time stamp methodology which begins at the RFID tag level in relation to the timing of the reader data call to the individual RFID tag is carried throughout the system with the master clock or program action regulator being held at the main data center and provides a central data ledger model and allows for quick identification of any external reader or device functionality problems and/or system data attacks or any attempts at data insertion. Data being sent from the external reader must meet the data and time stamp requirements identified by the master ledger for validation of system integrity. The data center master system does not send any reader initiation request(s) and can only change the resolution and updates within the central master ledger with the resolution notification change and therefore changes the expected data time stamps and increases or decreases the frequency of the expectation of data receipt. An attack or malfunction within the data center and main processing algorithm would be quickly identified secondary to multiple external readers sent data packets not having the appropriate data matching any open slot(s) within the main data or control ledger. If an individual RFID reader sends data packets which do not have a corresponding open data and time stamp slot within main data or the control ledger, the data would be stored in a separate file area and quarantined from the system for diagnostics to check for viruses or other malicious wear and to check that the date (data) and time stamps are in proper sequence as detailed above in relation to proper device functionality. If proper device functionality is identified, then the external reader software diagnostic checks would be run and any malware or viruses would be removed. The system would resync the external reader via the reader's software and monitoring would then continue. All data obtained during the time in question would be held in a quarantine-type area and would require manual upload into the standard system data ledger after the technical requirements were met. This methodology provides a complete system check and the ability to validate the data held within the main ledger (the storage database) is proper.

The problems solved by the inventive system are as follows:
1. Data loss secondary to RFID tags being written over before data is read.
2. Able to create miniature sensor embedded technology in a cost-effective manner which can send the data generated to a central location for efficient processing, thereby eliminating the need for expensive hardware and processing capabilities to be held at multiple individual locations which exponentially increases cost and complexity and larger sensor/monitoring systems limit individual mobility, as well.
3. RFID and other micro-systems many times are taken out of range or may have other issues that cause data loss or data integrity loss, thus, the inventive system undergoes complete system checks for functionality with every reading providing early identification on problems for customer notification and quick fix recommendations to customer before any catastrophic data loss can occur.

4. Having a method and a universal format for data to be safely and reliably transferred to a central location for improved complex AI data analysis, which works in tandem with the fact that the hardware needed for data acquisition and transfer may already be in place and distributed in mass to public and RFID tags are in 97% of all goods purchased in the U.S. and has similar distribution in all major economies.

5. Extending the life of a power source while keeping the overall device lightweight and providing a mechanism to collect data more often in relation to an event (through high resolution capabilities, for example).

6. Creates a method to provide data routing without using any identifying information or transfer of information in any usable format (to avoid raw data from undergoing processing prior to filtering and analysis of any possible intrusion data, virus, malware, etc.).

To achieve these improvements, the inventive system employs the use of, preferably, two RFID tags. The reader can be programmed to do data call to each RFID tag held in device based on CPC code of each tag individually. The RFID tag that the data from the sensor or other data source was written to can be excited or have a data call from the external reader sent to the first RFID tag connected to the system switch (initiator RFID tag). The system can have a rules engine attached including IF/THEN coding so that If the MCU receives data from the sensor (and formats accordingly to transmit/write over the RFID data tag), Then read data from the RFID data tag connected to the system switch (through the MCU program) deactivates the switch controlling the sensor on/off capability. The reader may also be programmed to perform the data call to sensor MCU data tag multiple times before performing data call to RFID tag connected to system switch. This lowers the available level of resolution, however it also provides greater data loss prevention. The MCU is programmed to turn off the system switch (voltage regulator switch) and therefor all power to any sensor or other data source and also includes the MCU itself. The MCU is programmed to only accept data for a certain amount of time after wakeup which is initiated by voltage coming from the sensor or other data source which has its power access controlled by the system switch. The time the MCU is programmed to accept data before the first action to be completed by the MCU, which is to turn off the system switch, is directly proportional to the amount of data space available on the RFID sensor MCU data tag. This simple design prevents RFID tag data overwrite, as well.

Most MCUs can accept data from 5 sensors or data sources and therefor up to 5 systems which would include up to 10 tags and could transmit and a data rate of (8k per tag×5 tags×40 times per second=1600 kbs). This data collection and transmission system identified above could be contain with in a box 1 CC in size, allowing for definitive data packet sizes for transfer and ultimately storage, at least.

As noted above, as well, the inventive system allows for complete system checks for functionality with every reading. This provides early identification on problems for customer notification and quick fix recommendations to a customer before any catastrophic data loss can occur, regardless of the end use thereof.

For facilitation of implementation, as well, and as noted previously RFID tags are present within 97% of all goods purchased in the U.S. and has similar distribution in all major economies. Additionally, such RFID tags also utilize common international programming language bases because such were was designed to provide a mechanism used in international commerce.

As indicated above, as well, resolution is based upon the length of time intervals between RFID tag data calls. This can be changed on demand or "as needed" based upon overall system rules engine held at data center. The external RFID reader and the reader's basic software operating system is integrated into the AI and/or rules engine/algorithm held at the data center (storage database) which can change the time interval of individual RFID data tag calls controlled by RFID reader software. Based upon real time operating parameters and sensor data the AI directs the RFID reader to increase resolution to more closely detail and acquire more data about a particular event or to decrease resolution to conserve device power supply, reduce processing demands on central data center AI, reduce bandwidth needed for data transmission, and reduce data storage size requirements.

Of further importance, if not convenience, is the fact that the RFID tag CPC codes are not readable by anything but an external RFID reader and there are so many RFID tags that if someone did not know the RFID CPC codes in the device there is no way to identify what device the tags are held in. With the present invention, the RFID CPC codes are only accessible by the RFID reader associated with the device RFID CPC codes and listed as "HOME or ID", thus providing an ultra-secure method of identification without any personal identifying data. It could be any number of devices with unlimited uses with one main key feature based upon need for small mobile device acquiring sensor or other data that requires transmission to large central data processing center for large population and therefore large amount of data processing in a cost-effective manner. The cost control is based upon the fact that one central processor doing a single function for large groups is less expensive and more efficient than multiple processors at the individual level sending processed information to a central data site for monitoring. This benefit is also key to permitting utilization and facilitation of cost-effective and reliable AI in relation to such continuously monitoring procedures.

In terms of AI associated with the data integrity system described herein, it is important to understand that any compromised data would render such AI capabilities ineffective. To the contrary, however, with the routing of such safely and reliably captured and transferred data packets for processing at the database level, a rules engine present within such a data center and in relation to an individual patient/device/item profile which is developed over data developed over time to highlight trends and map efficiency and predictability modeling, provides the desired outcome with such reliable data. The routing is accomplished through using the RFID tag CPC code and the external reader ID in order to have a proper identifying criteria in a standard format. As data is collected over long term, the patient/device/item profile is highlighted with data including, for patients, as one example, admission and therapy changes. These data points which are directly related to such a patient's overall health status are identified as variable such as IA for inpatient admission, ER for ER visit no admission, TC for therapy change, etc. The reason for these data points to be held as standard variables is to provide a methodology for data clustering or grouping and to create a time line of, for example, without limitation, capnography data, with key points highlighted in relation patient health status. This provides direct trend reference points in which decompensation in patient condition can be tracked and grouped and with other identical reference points in relation to data points associated with overall health status. Using multiple trend data samples from multiple events and finding some very similar if not exact data trends provides the basis for predictability monitoring and therefor earlier medical intervention to prevent severe patient health status decompensation. Most patient health status data events will be noted by system secondary to monitoring such as patient falling out of MD established parameters for notification of need for appointment, or for more severe cases the system notification of EMS. SMS, email, VOIP, direct operator call, and mobile APP may be integrated into the overall system for patient, provider, and all other medical or transportation service providers' communication. The longer a patient remains using the service the more effective and attuned to the specific biological functioning of the patient. The system can be configured to accept data points from other systems such as cardiac monitoring, oxygen delivery, pulsoximetry, etc. This thus contributes to the capability of building an enhanced patient profile providing an even more effective and accurate profile of patient health status and trends in therapies which enhance predictability monitoring. The system holds no true PII or PI just uses the RFID CPC code and the external reader ID to create an individual identity token (encryption for sending to the database, in other words). Using at least SHA2 encryption, for example, this allows for the functionality to hold diagnoses, certain medications being used, age, sex, and other demographic information in relation to patient in the patient profile in a non-usable data format. Additionally, this system also provides a methodology for big-data modeling in relation to certain generic patient data in a completely encrypted format to provide information to physicians, governmental and healthcare institutions with data to promote optimal respiratory patient health by creating the same predictability monitoring using for individual patients as it relates to a large group of patients meeting identified criteria.

Again, although this focuses, for the moment, on health care, and specifically capnography possibilities, it should be well understood, as outlined above, that these operations are usable within any monitoring context, whether the subject is a human, animal, device, item, even food, for that matter, to provide a semblance of predictive capabilities for such subjects in relation to trends measured and analyzed over time (and averaged, possibly).

As it thus concerns capnography, again, just one non-limiting example described above, the device may be as presented within the accompanying FIGS. 1 and 2. Therein are present two RFID tags, one in relation to a voltage regulator and regulator switch, and the other associated with and written on by a microprocessor unit (MCU) which has a flash memory with a formatting capability to modify data from captured state to one that may be written in raw state to the RFID tag, and an internal clock to allow for timing particulars, as well. There is, for capnography purposes, an IR source and a juxtaposed IR sensor as well as a battery for providing sufficient power to such a source (other types of sensors may not require such power levels, but, associated with the voltage regulator switch, such an IR system actually requires lower amounts of power than those that remain in an activated state indefinitely).

Thus, in relation to such a device, the first RFID tag is system initiator attached to system switch which should open with power surge from RFID tag discharged based upon cycling. The MCU remains dormant until it receives power from the sensor which requires activation of the system switch initiated by first RFID initiator tag. The MCU internal clock is set for a cycle requirement (such as for instance, and without limitation, a 10 hertz cycle, or 100 microseconds) which is the processing time. The MCU clock starts with a "wake up" secondary to receiving power from IR sensor and receives data from the sensor for the cycle time amount (for example, without limitation, again, 100 microseconds, or a 10 hertz cycle) based on the internal clock setting. Subsequently, the MCU programmed process is initiated at the end of each (10 hertz) cycle, at which time the MCU deactivates the system switch deactivating the sensor source and sensor. Thereafter, and the second process of the MCU, it transitions sensor-received data held in flash memory therein into proper format to write to the second RFID (data) tag. Then the MCU write such formatted data to the RFID data tag. The MCU clears its flash memory cache and "sleeps" until powered up by the sensor voltage increase with receipt of data itself. As noted above, for process checking purposes, the MCU should be connected to the initiator (first) RFID tag for discharge sensing purposes only whereby the MCU writes first RFID tag discharge data into cache if in active state; if it is in a dormant state, then no such record is generated by the MCU. Also, as noted above, the CPC codes for the RFID tags are also used for patient/device/item identification utilizing a tokenization method for security purposes (if needed). The external reader ID is thus used to assign other information for identification purposes (such as facility and doctor identifications for health patients, for one non-limiting example). The RFID tag CPC codes and external reader ID codes are used together to route information and data sent from RFID reader to data center for routing to an appropriate rules engine/machine learning AI within the database, as well.

The overall system further includes some assumptions and standards for operational guidelines and purposes. Identical RFID tags with known tag values require the same energy to discharge data for reading by reader and also to initiate system switch (which is important for low-power purposes and overall reliability of the inventive system in terms of data integrity). The rationale and proof is that such uniformity in tag values prevents the overwriting of data on the RFID data tag before it is transferred to the external reader. Likewise, then, it is important that the MCU acquires a set amount of data packet sample (100 microseconds/10 hertz of data, for example) to allow for the exactness of time and data size (possibly) for the database to "fill" the open slots in relation to such specifics. The number of cycles per minute may be attenuated as needed throughout the system through the programming of the external reader to request data call/read of tags at specified time intervals. The RFID tag number is used by the system and not in any way by the customer. An RFID tag number is the CPC code and cannot be read by the human eye in any manner. The system may be supplemented by a login and password for the patient/device/item portal and may further employ (simple) out of band verification for safety in this manner, if necessary. Such out of band protocols may use open source OATHE protocols, and additionally, or in substitution thereof, it may utilize an EMOJI device (such as driven by systems developed by Symshield).

Such a capnography device, again, as but one possible type of monitoring device out of myriad possibilities in myriad areas, is provided in a miniaturized size and state in comparison with typical capnography instruments. Such may simply snap on/clip to an established structure (such as a CPAP mask, nasal cannula oxygen delivery device, and the like) with the components as presented within the drawing and described above. Such a capnograph fits on a patient's face with nasal prongs pointed upward and in a side slot end piece; its size is about 1.2 cm cubed is placed into each side with a cable coming from each cube. Such a small size device, coupled with the remote monitoring discussed herein with an external reader and storage database accessible by such an external reader under any standard wireless communication protocol, permits a number of beneficial results for a patient. Different options are mainly in the form of multi-system integrated monitoring such as perimeters for wandering patients, healthy lifestyle optimization such as having monthly report read by a physician, and they can order the small component pieces of such a device easily for repair, etc., more often. Such a patient may further order more external RFID readers to have in multiple rooms of the house so they would not have to move the one that comes with system. Again, with IR sensors, at least, a certain amount of continuous battery power is needed to account for the high requirements of such a sensor and source. Thus, a graphene, lithium ion, or like, battery (compact for the small device) may be utilized having a battery life for the RIFD device of roughly 12 hours possibly more through on demand resolution control. The recharging occurs through a micro-USB plug on the device, if necessary. It would have a USB connection so it could charge using all the options available to cell phones or other devices including wall plug, computer, or those small devices which provide remote charging capabilities. Charging may also be accomplished while the device is actually worn, as well. The system would include a low battery alert which can be send to cell phone, call landline using VOIP and we could add an indicator light to device (very small LED).

Alternatively, the system may include an NFC component for MCU transfer and reader transmission, if desired. Such an NFC components provides the mobility with the tap and pair functionality out of the box. The patient/device/item provides a wifi or LAN ID and password so that the external reader/writer may work and link in as soon as it comes out of the box. The patient/device/item can then access the appropriate communication portal for the ability to change external reader settings remotely. Since the system does complete device functionality checks at least 3 times a second, if for some reason such requests are missed, such can be handled remotely by a suitable technical team as any missing external reader data calls would require intervention to ensure the device is functioning properly. In addition, if needed, the patient/device/item would be notified to switch to NFC and cellular protocols until the system is corrected as needed. Additionally, there can be provided an app or like program for download to a communication device (smart phone, for instance) which provides parameters that can be updated so that the device only sends to the data center at the moment of wifi link, LAN link, or if data coming from the device falls outside of set parameters. Such travel, mobility, and hardware factors are important components of the system versatility, as well.

Thus, in terms of the potentially preferred embodiment relating to capnography, such an inventive system relates to a capnograph including a suitable sensor to monitor (and measure) carbon dioxide concentration and respiratory rate for a target patient. Such a device utilizes a RFID or NFC component for recordation and transfer of capnographic information from the device to an external reader and ultimately on to a data center for constant monitoring and immediate notification as needed. Such information is gathered through a repetitive infrared (4.3 mm wavelength) source and appropriate sensor that cycle in terms of power up and down in relation to RFID data call receipt from the external reader (through a voltage sensor and switch). The IR source and sensor are oppositely configured on sides of a breathing tunnel component within the device to permit continuous and cyclical excitation of present carbon dioxide ostensibly to create an initial reading for the target patient's capnogram in relation to voltage differences over time. The IR sensor is connected to and transfers collected data to a microprocessing (MCU) unit that stores such information within its flash memory, shuts off the voltage regulator switch, formats the received and stored data, and transfers the formatted data to the RFID or NFC data collection component. The shutoff of the voltage regulator switch triggers power down of the IR source and sensor (to prevent burnout and allow for cyclical measurements) until the data call from the external RFID reader causes the voltage sensor proximate to the RFID power up component to notice a voltage increase, thus initiating the power up procedure again with the IR source and sensor, thereby sending data to the MCU, and so on. The data call to the RFID or NFC data receiving/transferring component thus causes immediate transfer of all data transferred from the MCU to the RFID or NFC data receiving component to transfer to the external reader and on to the data center. At the data center, the received data is transitioned from such raw data into a capnographic waveform through the utilization of a suitable algorithm and/or rules engine. In this manner, a base waveform is developed for each target patient and the repetitive readings create a means to create a standard by which all further monitored breathing ($CO_2$ measurement and respiratory rate) for such a target patient is compared. Any degree of deterioration from the standardized measure is analyzed for the potential for intervention with assessments for routine physician notification up to emergency notification, all provided through the encompassed system itself. Thus, the capnograph device essentially provides the means for constant, real-time, and remote monitoring of a target patient's $CO_2$ inhalation and exhalation concentration data, respiratory rate, and consequent overall respiratory status with fully reliable identification of the patient, location, and treating physician, as well as automatic notification to all necessary parties should a compromised measurement exist at any time the device is properly worn and utilized. Such a device allows for a number of beneficial results, improving the monitoring and treatment of patients having respiratory conditions, at least.

Patients, care givers, and medical providers can be notified immediately when capnography reading falls outside of individual patient directed parameters. In addition the system provides a mechanism for resolution adjustment in real time based upon need. This provides both the benefit of energy savings and the ability to increase level of monitoring as needed. This need may be identified by one or multiple reading outside of defined patient profile monitoring parameters or by the identification of trends noted in the patient predictability modeling of patient health status decompensation. This gives the patients healthcare provider with a more complete and detailed report highlighting the need for possible intervention that patient has shown with previous health status change. Resolution is controlled by the increase in the Hertz cycle of the RFID tag data call which is in direct relation to the static MCU internal processing clock.

Patient healthcare providers (or analogous device manufacturers/suppliers/repairpersons, etc.) will be able to request a standard capnography (or other sensor device reading, etc.) report for reading in addition to the notification in change in patient capnography data which may include falling outside the defined parameters for patient profile for acceptable $CO_2$ level or by system identifying trend noted in patient predictability model with the data associated with system prediction sent to a healthcare provider and or patient. The health care (or other type) provider can have secure individual configurable API access with multiple options for notification, report views, sorting, etc. In addition, medical (or like) facilities or other groups or individuals which are identified by patient as needing access to respiratory status capnography monitoring may also have a filtered view secure individual configurable API based upon need and patient or healthcare provider direction.

The patient profile may also be configured to used data from other systems such as bed alarms, perimeter alarms, or other systems to configure a secondary or dependent rules engine to enhance functionality for those such as Dementia patients in relation to wondering or getting lost using the systems indicated above. In addition, our system can send other respiratory systems such as CPAP, Ventilator, or other oxygen delivery systems real time data regarding respiratory status for titration, or modification of therapy parameters such as increasing $FIO_2$.

Viewing this as an analogous system in relation to anything having a continuous monitoring capability and the need for raw data capture, but processing only after any determination (definitively) of the presence of unexpected data within a transferred data packet, it should be evident that any type of measured consideration for condition and status surveillance (and possible notification of difficulties therein) may be implemented in the same basic fashion. Thus, the overall inventive system and method is not to be taken in any limited manner or fashion with this disclosure and all due breadth and scope should be accorded in relation to the actualities provided herein.

At its broadest, the inventive system would include a device having a physical housing, at least one microprocessor unit including an internal clock, at least one (up to 5 per microprocessor unit present) sensor originating source component, at least one (up to 5 per microprocessor unit present) measuring sensor, at least one voltage regulator with a voltage regulator switch to control activation of said sensor source(s) and said sensor(s); at least one power initiating RFID tag providing an initiating voltage for sensing by the voltage regulator; at least one component to receive formatted data from the MCU and transfer received data to an external reader, said component being either i) a data receiving and transferring RFID tag to transfer such data to an external RFID reader, or ii) a data receiving and transferring NFC tag and antennae to transfer such data to an external NFC reader, said NFC tag being compliant with and utilizing the ISO/IEC 15693 standard; and, optionally, at least one power supply;

wherein said sensor source and said sensor are configured appropriately and aligned for emission of a beam or like result directly towards said sensor for measurement of a subject measurable article, level, dimension, condition, and the like; wherein said microprocessor unit is connected to said sensor to permit transmission of data from said sensor to said microprocessor unit; wherein said microprocessor unit includes a flash memory component that is formatted to receive said sensor-transmitted data; wherein said microprocessor unit includes a program to format said sensor transmitted data for proper transmission to and write on capability on said data receiving and transferring RFID tag or said NFC tag; wherein said data receiving and transferring RFID or NFC tag is programmed to receive a data call from a suitable external reader device, said data call and programmed status permitting transfer of the data received from said microprocessor unit to said external reader; wherein said voltage regulator is located in proximity to said power initiating RFID tag to sense RFID activation upon receipt of a data call from said external reader; wherein said power supply, if present, continuously provides electrical power to said sensor source, said sensor, and, possibly, said MCU; wherein said voltage regulator activates said sensor source and said sensor upon activation through sensing said power initiating RFID activation, thereby acting as a switch to permit transmission of power from said power supply to said source and said sensor; wherein said sensor generates data from the emission leading therefrom said source to said sensor; wherein said data generated by said sensor automatically transmits to said microprocessor unit; wherein said microprocessor unit is programmed to receive said data and to deactivate said sensor and said source at a set time interval in relation to said internal clock, thereby limiting the actual amount of data transmitted by and received from said sensor; wherein said MCU stores all transferred information from said sensor within its flash memory; wherein said MCU automatically formats and transfers all received and stored information to said data receiving and transferring RFID or NFC tag thereby reading on said data receiving and transferring RFID or NFC tag such information; wherein said MCU is programmed to stop receipt of information from said sensor and power down both said source and said sensor in evenly timed intervals, whereupon said MCU transfers said information to write upon said data receiving and transferring RFID or NFC tag; wherein said data receiving and transferring RFID or NFC tag sends all received information form said MCU to said external reader upon each data call; wherein said suitable external reader transfers all received information from said at least one RFID or NFC tag to said data center; and wherein the total size of said housing is low-profile. Additionally, then the invention also encompasses a method of providing continuous surveillance and external notifications for a target audience in relation to a status and condition monitored by a device, said method including the steps of: providing a device (as noted above); providing an external reader attuned for transmission of signals to and receipt of data from said data receiving/transmitting RFID or NFC tag; providing a data center external to both said external reader and said device, said data center attuned with said external reader to receive data transmitted from said data receiving/transmitting RFID or NFC tag thereto, and said data center including at least one algorithm and/or rules engine to analyze and act upon said received data; introducing said device within a proximate distance of the item to be monitored; sending a data call signal from said external reader to both of said data receiving/transmitting RFID or NFC tag and said power initiating RFID tag, thereby creating an electrical signal within both of said power initiating RFID tag and said data receiving/transmitting RFID or NFC tag to transmit any data written thereon to said external reader and simultaneously causing said electrical signal within said power initiating RFID tag to activate said voltage regulator to activate the switch of power supply to said source and said sensor and thereby creating an electrical signal; receiving samples for monitoring within or proximal to said device wherein said activated source provides said emission to said activated sensor within and/or proximate thereto said monitored item is present and measured by said source, in relation to fluctuations of voltage measured thereby; transferring said captured measurement data from said activated sensor to said microprocessing unit, said transmission of data causing said at least one microprocessor unit to receive said data and to subsequently indicate deactivation by said voltage regulator, thereby causing said source and said sensor to power down until reactivated by said voltage regulator, wherein said microprocessing unit remains activated for receipt of data, but is limited to such data transmitted by said activated sensor, wherein said transmitted data is stored within said flash memory of said microprocessing unit; formatting of said transmitted data stored within said flash memory to a suitable language for transmission and writing on said data receiving/transmitting RFID or NFC tag; transmitting said formatted data from said at least one microprocessing unit to said data receiving/transmitting RFID or NFC tag; transmitting said received data from said data receiving/transmitting RFID or NFC tag to said external reader in response to a subsequent data call; and repeating each step indefinitely thereafter; wherein said external reader received data is transmitted to said external data center in relation to the identity of the target item associated with said device and said external reader, wherein said external data center may transform said received data to a waveform representation for continuous comparative review of said target item's standard status for surveillance purposes, wherein any deterioration and/or degradation of such a waveform signal will further allow for target item owner/manufacturer/care provider, etc., notification, emergency notification, or both, dependent upon the severity of any detected deterioration and/or degradation.

As it concerns, then, capnography, such a system may include a capnography device and/or method utilizing the same, as described generally below:

A capnograph comprising a three-dimensional housing, said housing including:
a) a hollow pass-through chamber,
b) one microprocessor unit including an internal clock,
c) one IR source,
d) one IR sensor,
e) one voltage regulator;
f) a power initiating RFID tag providing an initiating voltage for sensing by the voltage regulator;
g) a component to receive formatted data from the MCU and transfer received data to an external reader, said component being either i) a data receiving and transferring RFID tag to transfer such data to an external RFID reader, or ii) a data receiving and transferring NFC tag and antennae to transfer such data to an external NFC reader, said NFC tag being compliant with and utilizing the ISO/IEC 15693 standard; and
h) one power supply;
wherein said IR source and IR sensor are configured on opposing sides of said pass-through chamber and aligned for emission of an IR beam directly towards said IR sensor;
wherein said IR source is programmed to emit an IR beam at a 4.30 mm frequency;
wherein said microprocessor unit is connected to said IR sensor to permit transmission of data from said IR sensor to said microprocessor unit;
wherein said microprocessor unit includes a flash memory component that is formatted to receive said IR sensor-transmitted data;
wherein said microprocessor unit includes a program to format said IR-sensor transmitted data for proper transmission to and write on capability on said data receiving and transferring RFID tag or said NFC tag;
wherein said data receiving and transferring RFID or NFC tag is programmed to receive a data call from a suitable external reader device, said data call and programmed status permitting transfer of the data received from said microprocessor unit to said external reader;
wherein said voltage regulator is located in proximity to said power initiating RFID tag to sense RFID activation upon receipt of a data call from said external reader;
wherein said power supply continuously provides electrical power to said IR source, said IR sensor, and said MCU;
wherein said voltage regulator activates said IR source and said IR sensor upon activation through sensing said power initiating RFID activation, thereby acting as a switch to permit transmission of power from said power supply to said IR source and said IR sensor;
wherein said IR sensor generates data from the emission beam passing through said open chamber from said IR source;
wherein said data generated by said IR sensor automatically transmits to said microprocessor unit;
wherein said microprocessor unit is programmed to receive said data and to deactivate said IR sensor and said IR source at a set time interval in relation to said internal clock, thereby limiting the actual amount of data transmitted by and received from said IR sensor;
wherein said MCU stores all transferred information from said IR sensor within its flash memory;
wherein said MCU automatically formats and transfers all received and stored information to said data receiving and transferring RFID or NFC tag thereby reading on said data receiving and transferring RFID or NFC tag such information;
wherein said MCU is programmed to stop receipt of information from said IR sensor and power down both said IR source and said IR sensor in evenly timed intervals, whereupon said MCU transfers said information to write upon said data receiving and transferring RFID or NFC tag;
wherein said data receiving and transferring RFID or NFC tag sends all received information form said MCU to said external reader upon each data call;
wherein said suitable external reader transfers all received information from said at least one RFID or NFC tag to said data center;
wherein both RFID tags are passive UHF RFID, namely EPC GEN 2 tags which comply with the ISO 18000-6C standard; and
wherein the total size of said housing, within which all of said components are attached and present, is defined by a range of 3 to 10 millimeters wide, a range of 3 to 10 millimeters long, and from 3 to 10 millimeters deep.

With the method potentially interpreted as: a method of providing continuous surveillance and external notifications for a target patient in relation to his or her respiratory status and condition, said method including the steps of:
i) providing said capnograph of above;
ii) providing an external reader attuned for transmission of signals to and receipt of data from said data receiving/transmitting RFID or NFC tag;
iii) providing a data center external to both said external reader and said capnograph, said data center attuned with said external reader to receive data transmitted from said data receiving/transmitting RFID or NFC tag thereto, and said data center including at least one algorithm and/or rules engine to analyze and act upon said received data;

iv) introducing said capnograph within an oxygen delivery device wherein said capnograph is placed in close proximity to said target patient's mouth to allow for exhale samples to pass through said chamber;

v) sending a data call signal from said external reader to both of said data receiving/transmitting RFID or NFC tag and said power initiating RFID tag, thereby creating an electrical signal within both of said power initiating RFID tag and said data receiving/transmitting RFID or NFC tag to transmit any data written thereon to said external reader and simultaneously causing said electrical signal within said power initiating RFID tag to activate said voltage regulator to activate the switch of power supply to said IR source and said IR sensor and thereby creating an electrical signal;

vi) receiving said exhale samples within said capnograph chamber wherein said activated IR source provides said IR beam from one side of said chamber to said activated IR sensor on the opposing side of said chamber, wherein said IR beam, when powered to emit, excites molecules within said chamber present samples at that moment in time to permit measurement of concentration of carbon dioxide during each power up status in relation to fluctuations of voltage measured thereby;

vii) transferring said captured measurement data from said activated IR sensor to said microprocessing unit, said transmission of data causing said at least one microprocessor unit to receive said data and to subsequently indicate deactivation by said voltage regulator, thereby causing said IR source and said IR sensor to power down until reactivated by said voltage regulator, wherein said microprocessing unit remains activated for receipt of data, but is limited to such data transmitted by said activated IR sensor, wherein said transmitted data is stored within said flash memory of said microprocessing unit;

viii) formatting of said transmitted data stored within said flash memory to a suitable language for transmission and writing on said data receiving/transmitting RFID or NFC tag;

ix) transmitting said formatted data from said at least one microprocessing unit to said data receiving/transmitting RFID or NFC tag;

x) transmitting said received data from said data receiving/transmitting RFID or NFC tag to said external reader in response to a subsequent data call; and xi) repeating each step indefinitely thereafter;

wherein said external reader received data is transmitted to said external data center in relation to the identity of the target patient associated with said capnograph and said external reader, wherein said external data center may transform said received data to a waveform representation for continuous comparative review of said target patient's standard breathing for surveillance purposes, wherein any deterioration and/or degradation of such a waveform signal will further allow for target patient physician, notification, emergency notification, or both, dependent upon the severity of any detected deterioration and/or degradation.

No limitation is intended with this disclosure as to the utility and breadth of the overall system of providing data integrity described herein, including, without limitation, the myriad end uses and industries such may be provided to and for and utilized within, the block-chain capabilities such a system provides within any such industry alluded to above, the artificial intelligence capabilities such a reliable data capture and transfer method provides within any industry, and any device and/or method implementing and/or employing such a disclosure provided herein.

The invention claimed is:

1. A device having a physical housing, at least one microprocessing computerized unit (MCU) including an internal clock, at least one sensor originating source component, at least one measuring sensor, at least one voltage regulator with a voltage regulator switch to control activation of said at least one sensor originating source component and said at least one measuring sensor; at least one power initiating RFID tag providing an initiating voltage for sensing by the voltage regulator; at least one component to receive formatted data from said MCU and transfer received data to an external reader, said component being either i) a data receiving and transferring RFID tag to transfer such data to an external RFID reader, or ii) a data receiving and transferring NFC tag and antennae to transfer such data to an external NFC reader, said NFC tag being compliant with and utilizing the ISO/IEC 15693 standard; and, optionally, at least one power supply;

wherein said at least one sensor originating source component and said at least one measuring sensor are configured appropriately and aligned for emission of a beam or like result directly towards said sensor for measurement of a subject measurable article, level, dimension, condition, and the like; wherein said MCU is connected to said at least one measuring sensor to permit transmission of data from said at least one measuring sensor to said MCU; wherein said MCU includes a flash memory component that is formatted to receive data transmitted from said at least one measuring sensor; wherein said MCU includes a program to format said data transmitted from said at least one measuring sensor for proper transmission to and write on capability on said data receiving and transferring RFID tag or said NFC tag; wherein said data receiving and transferring RFID or NFC tag is programmed to receive a data call from a suitable external reader device, said data call and programmed status permitting transfer of the data received from said MCU to said external reader; wherein said voltage regulator is located in proximity to said power initiating RFID tag to sense RFID activation upon receipt of a data call from said external reader; wherein said power supply, if present, continuously provides electrical power to said at least one sensor originating source component, said at least one measuring sensor, and, possibly, said MCU; wherein said voltage regulator activates said at least one sensor originating source component and said at least one measuring sensor upon activation through sensing said power initiating RFID activation, thereby acting as a switch to permit transmission of power from said power supply to said at least one sensor originating source component and said at least one measuring sensor; wherein said at least one measuring sensor generates data from the emission leading therefrom said at least one sensor originating source component to said at least one measuring sensor; wherein said data generated by said at least one measuring sensor automatically transmits to said MCU; wherein said MCU is programmed to receive said data and to deactivate said at least one measuring sensor and said at least one sensor originating source component at a set time interval in relation to said internal clock, thereby limiting the actual amount of data transmitted by and received from said at least one measuring sensor;

wherein said MCU stores all transferred information from said at least one measuring sensor within its flash memory; wherein said MCU automatically formats and transfers all received and stored information to said data receiving and transferring RFID or NFC tag thereby reading on said data receiving and transferring RFID or NFC tag such information; wherein said MCU is programmed to stop receipt of information from said at least one measuring sensor and power down both said at least one sensor originating source component and said at least one measuring sensor in evenly timed intervals, whereupon said MCU transfers said information to write upon said data receiving and transferring RFID or NFC tag; wherein said data receiving and transferring RFID or NFC tag sends all received information from said MCU to said external reader upon each data call; wherein said suitable external reader transfers all received information from said at least one RFID or NFC tag to a storage database; and wherein the total size of said housing is low-profile.

2. A method of providing transferred data integrity utilizing the device of claim 1.

\* \* \* \* \*